United States Patent [19]

Ohta et al.

[11] Patent Number: 4,818,853
[45] Date of Patent: Apr. 4, 1989

[54] DATA CARD WITH INDUCTIVE SIGNAL TRANSFER DEVICE

[75] Inventors: Toshihiko Ohta; Kazuyoshi Fuse; Kunio Ohmi; Toshiaki Sato; Masayuki Shinozaki, all of Yokohama, Japan

[73] Assignee: Kabushiki Kaisha Toshiba, Kanagawa, Japan

[21] Appl. No.: 53,758

[22] Filed: May 26, 1987

[30] Foreign Application Priority Data

May 26, 1986 [JP] Japan .................................. 61-119311
Aug. 29, 1986 [JP] Japan .................................. 61-201715
Aug. 29, 1986 [JP] Japan .................................. 61-201729

[51] Int. Cl.4 ........................................... G06K 19/06
[52] U.S. Cl. ..................................... 235/492; 235/380
[58] Field of Search ......................... 235/487, 492, 380

[56] References Cited

U.S. PATENT DOCUMENTS

| 3,906,460 | 9/1975 | Halpern | 235/487 X |
|---|---|---|---|
| 4,277,337 | 7/1981 | Stuckert | 364/900 |
| 4,298,793 | 11/1981 | Mevis | 235/487 |
| 4,605,844 | 8/1986 | Haggan | 235/380 |

FOREIGN PATENT DOCUMENTS

| 0058029 | 8/1982 | European Pat. Off. . |
|---|---|---|
| 0180380 | 7/1986 | European Pat. Off. . |
| 1152742 | 8/1963 | Fed. Rep. of Germany . |
| 57-52620 | 11/1982 | Japan . |
| 60-259713 | 11/1985 | Japan . |
| 61-32698 | 2/1986 | Japan . |
| 86/04705 | 8/1986 | PCT Int'l Appl. . |
| 2130412 | 3/1982 | United Kingdom . |
| 2148075 | 10/1983 | United Kingdom . |

OTHER PUBLICATIONS

WO83/03018, 9/83, Cremin.

Primary Examiner—Harold I. Pitts
Attorney, Agent, or Firm—Finnegan, Henderson, Farabow, Garrett & Dunner

[57] ABSTRACT

A data card which can be resiliently flexed to a degree. The data card includes a laminated structure member having at least a synthetic resin protective layer and a ferromagnetic material layer, an electric circuit device embedded in the laminated structure member and an electro-magnetic transducer having a pair of coils which are formed on the laminated structure member. The pair of coils are coupled to the electric circuit device for generating magnetic fluxes of opposite directions with each other according to an information signal applied from the electric circuit device. Alternatively, the pair of coils are provided for receiving magnetic fluxes of opposite directions with each other and coupled to the electric circuit device for applying an electric signal generated by the magnetic fluxes of opposite directions thereto.

25 Claims, 5 Drawing Sheets

DATA CARD WITH INDUCTIVE SIGNAL TRANSFER DEVICE

BACKGROUND OF THE INVENTION

1. Field of the Invention

This invention relates generally to data cards, and more particularly, to inductive signal transfer devices of data cards.

2. Description of the Prior Art

There have been developed data cards which are carried on the person for use as a credit card or the like, and which include information data record mediums such as magnetic stripes or memory mediums such as semiconductor memories, adapted to interact with circuitry in a receptor in which the data card is placed so as to operate on information data stored in the data record mediums or the memory mediums of the data card. Recently, the there has been a demand for data cards with a capacity to store a greater and greater amount of information data. For responding to the increasing demand, there have been developed data cards which include a semiconductor device such as the semiconductor memory instead of the magnetic stripe. The data cards of such type are usually provided with another semiconductor device such as a micropcomputer adapted to process information data, together with the semiconductor memory. As is well known, the semiconductor devices are generally fabricated in the form of an integrated circuit (referred to as an IC hereafter). The data cards which comprise the semiconductor devices are referred to as IC cards.

Conventionally, the IC cards are equipped with connectors (referred to as card-connectors hereafter) made of conductive material for transferring an information data and/or a drive signal for activating circuits in the IC cards. The card-connectors are adapted for electrically coupling with other connectors (referred to as reader-connectors hereafter) provided in an information data reading/writing apparatus for processing the information data. The apparatus is generally called a card reader. Thus, the work "card reader" is used in this specification for meaning an apparatus which is provided for writing information data into the data cards such as the IC cards or cards with magnetic stripes (referred to as magnetic cards hereafter) and/or reading out information data therefrom. The card-connectors of the IC cards mechanically contact the reader-connectors equipped in the card reader.

The conventional IC cards have a drawback in which the mechanical contacts between the connectors of the IC cards and the card readers, i.e., the card-connectors and the reader-connectors are inferior in reliability. For example, the card-connectors, which come into mechanical contact with the reader-connectors in the card readers, may eventually become worn away. Thus, contact errors are sometimes caused between the card-connectors and the reader-connectors. If the top surface of the card-connector is made somewhat lower in level than other parts of the IC card, a contact error can be caused by dust which may gather on the lowered surface of the card-connector.

Furthermore, the conventional IC cards have another drawback. That is, the the conventional IC cards cannot be used with the card readers which are adapted for use with the conventional magnetic cards.

The conventional IC cards of such type have still another drawback as follows. If the card-connectors of the IC card come into contact with any substance, such as clothes made of synthetic fibers, which is charged with a lot of static electricities, the semiconductor devices such as the microcomputer and the memory are liable to be damaged by the static electricities.

Then, there has been proposed another signal transfer system due to an electro-magnetic coupling. In the system, both the IC card and the card reader are equipped with electro-magnetic transducers, respectively, which are provided for electro-magnetically coupling between each other. Thus, information data are transferred between the IC cards and the card readers, without relying upon the mechanical contacts between connectors. The IC cards equipped with such an electro-magnetic transducer are free from the drawbacks of the prior art IC cards.

The conventional electro-magnetic transducer for the IC cards is formed to a coil configuration by a thin film conductor or a sheet conductor. A card reader adapted for the IC cards also is equipped with a similar electro-magnetic transducer, i.e., a type of the coil configuration. For the conventional data cards and the card readers equipped with electro-magnetic transducers of such type, a reference is made to the U.S. Pat. No. 4,605,844.

The IC cards equipped with the electro-magnetic transducers are desired to be compatibly available for conventional card readers adapted for magnetic cards. The card readers for the magnetic cards (referred to as magnetic card readers hereafter) are equipped with an electro-magnetic transducer of another type, e.g., a magnetic head. As is well known, the magnetic head is comprised of a ring-shape core with a gas and a coil wound on the core.

The conventional IC cards equipped with the coil type electro-magnetic transducer are insufficient for being in conformity with the conventional magnetic card readers. That is, the coil type electro-magnetic transducer fails to transfer a sufficient amount of magnetic flux between the magnetic head type electro-magnetic transducer of the conventional magnetic card readers.

Furthermore, the conventional IC cards equipped with the coil type electro-magnetic transducer still have a drawback. That is, the electric-magnetic transducer used in the conventional IC cards is easily affected by a noisy magnetic flux other thant he magnetic flux applied from the card readers adapted for the IC cards.

SUMMARY OF THE INVENTION

Accordingly, an object of the present invention is to provide an electro-magnetic transducer for a data card, which is compatibly available for conventional magnetic card readers.

Another object of the present invention is to provide an electro-magnetic transducer for a data card, which is able to transfer a sufficient amount of magnetic flux between electro-magnetic transducers of the conventional magnetic card readers and the data card.

Still another object of the present invention is to provide an electro-magnetic transducer for a data card, which is hardly affected by a noisy magnetic flux other than magnetic flux applied from a card reader adapted for the data card.

In order to achieve the above objects, a data card according to one aspect of the present invention includes a laminated structure member having at least a top synthetic resin protective layer and a ferromagnetic material, an electric circuit device embedded in the laminated structure member and an electro-magnetic transducer having a pair of coils which are formed on the laminated structure member, the pair of coils being coupled to the electric circuit device for generating magnetic fluxes of opposite directions with each other according to information signal applied from the electric circuit device. A data card according to one aspect of the present invention includes a laminated structure member having at least a top synthetic resin protective layer and a ferromagnetic material, an electric circuit device embedded in the laminated structure member and an electro-magnetic transducer having a pair of coils which are formed on the laminated structure member, the pair of coils being provided for receiving magnetic fluxes of opposite directions with each other and coupled to the electric circuit device for applying an electric signal generated by the magnetic fluxes of opposite directions thereto.

DESCRIPTION OF THE PREFERRED EMBODIMENT

The present invention will be described in detail with the reference to the accompanying drawings, namely, FIGS. 1 to 9. Throughout the drawings, like references and letters are used to designate like or equivalent elements for the sake of simplicity of explanation.

Figure 1:
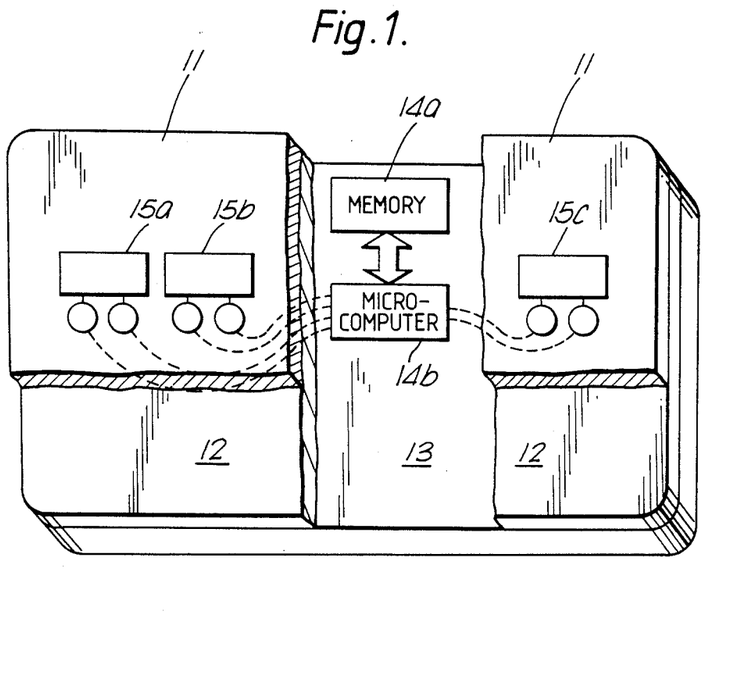
FIG. 1 is a schematic partially-broken away perspective view of a data card according to the present invention.

Referring now to FIG. 1, an embodiment of the data card or the IC card, according to the present invention, will be described in detail. As shown in FIG. 1, the IC card 10 can be resiliently flexed to a degree and has a laminated structure comprising a top synthetic resin protective layer 11, a central layer 12 of a ferromagnetic material and a bottom synthetic resin layer 13. Electric circuit devices such as a semiconductor memory chip 14a, a microprocessor chip 14b or the like are embedded in the bottom synthetic resin layer 13. The semiconductor memory chip 14a is electrically connected to the microprocessor 14b in the bottom synthetic resin layer 13. The semiconductor memory chip 14a and the microprocessor 14b are usually fabricated to the IC configuration.

A plurality of inductive signal transfer devices, i.e., first, second and third inductive signal transfer devices 15a, 15b and 15c are formed on a surface of the top synthetic resin protective layer 11. The first, second and third inductive signal transfer devices 15a, 15b and 15c are electrically coupled to the microprocessor 14b, respectively. Each of the first, second and third inductive signal transfer devices 15a, 15b and 15c is formed into the coil configuration by any conventional technique such as a print circuit technique, as identical with the coil type electro-magnetic transducer or the conventional IC cards. That is, the first, second and third inductive signal transfer devices 15a, 15b and 15c are formed by a thin film conductor or a sheet conductor. The first inductive signal transfer device 15a is adapted for transmitting information data stored in the semiconductor memory chip 14a to a card reader (not shown). The second inductive signal transfer device 15b is adapted for receiving information data from the card reader. The third inductive signal transfer device 15c is adapted for receiving a driving signal or a power signal from the card reader. The first, second and third inductive signal transfer devices 15a, 15b and 15c have an identical construction with each other, as described in detail below. When the IC card 10 is provided with a cell for activating the semiconductor memory chip 14a and the microprocessor 14b, the third inductive signal transfer device 15c can be eliminated.

Referring now to FIGS. 2 to 7, some typical examples of the construction of the first, second and third inductive signal transfer devices 15a, 15b and 15c, e.g., the first inductive signal transfer device 15a will be described. FIGS. 2 to 7 diagramatically show the examples, respectively.

Figure 2:
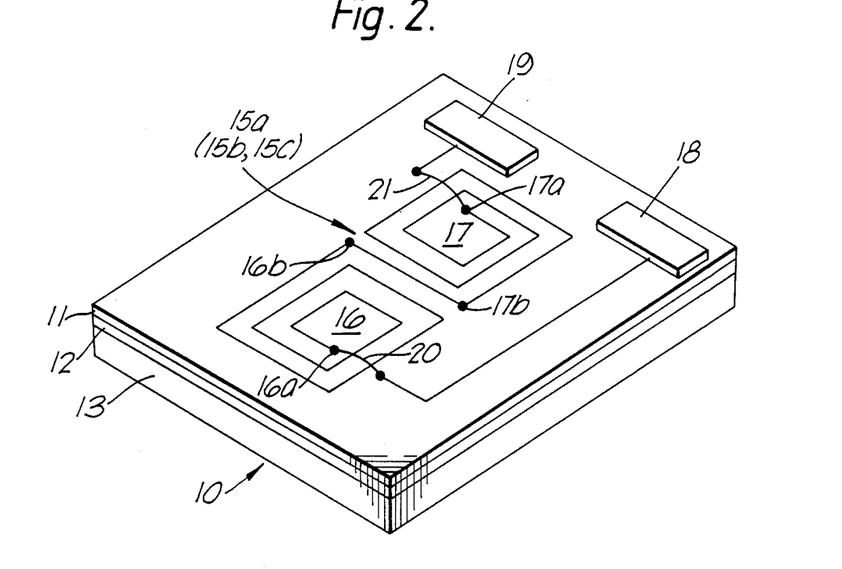
FIG. 2 is a diagramatic plan view of the first example of the electro-magnetic transducer according to the present invention.

As shown in FIG. 2, first example of the first inductive signal transfer device 15a is comprised of a pair of coils, i.e., a first and second coils 16, 17. The first and second coils 16, 17 are each comprised of a plurality of turns so that the first and second coils 16, 17 are wound spirally in the same directions. For example, the first and second coils 16, 17 are wound outward in the clockwise direction. The first and second coils 16, 17 of the spiral coil configuration have first ends 16a, 17a and second ends 16b, 17b, respectively. The first ends 16a, 17a are the start ends of coil winding for the first and second coils 16, 17 in the clockwise direction, respectively. The second ends 16b, 17b are the finish ends of coil winding for the first and second coils 16, 17 in the clockwise direction, respectively. Thus, the respective first ends 16a, 17a, of the first and second coils 16, 17 make the inner ends of the spiral coils. While, the respective second ends 16b, 17b of the first and second coils 16, 17 make the outer ends of the spiral coils. However, the first and second coils 16, 17 can be comprised of one turn of coil, respectively, as described later.

The first ends 16a, 17a of the first and second coils 16, 17 are coupled to a pair of connecting terminals, i.e., first and second connecting terminals 18, 19 through jumper wires 20, 21 cross parts of the first and second coils 16, 17, but are insulated from the turns by a conventional manner. For example, the jumper wires 20, 21 are formed across the parts of the first and second coils 16, 17 in a conventional laminated print circuit technique.

Figure 3:
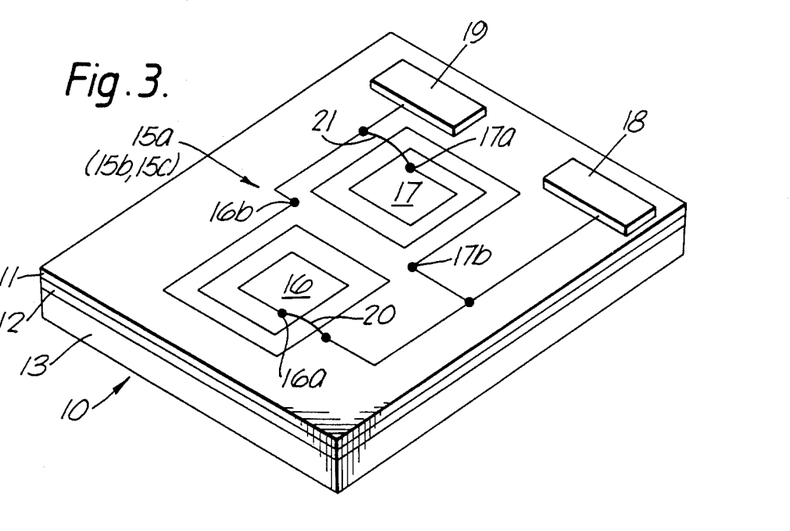
FIG. 3 is a diagramatic plan view of the second example of the electric-magnetic transducer according to the present invention.

Referring now to FIG. 3, a second example of the first, second and third inductive signal transfer devices 15a, 15b and 15c, e.g., the first inductive signal transfer device 15a will be described. In this second example, the first inductive signal transfer device 15a is comprised of a first and second coils 16, 17 in a manner similar to that of the first example of the first inductive signal transfer device 15a (see FIG. 2). The first and second coils 16, 17 are each comprised of a plurality of turns so that the first and second coils 16, 17 are wound spirally outward in the clockwise direction. The first and second coils 16, 17 of the spiral coil configuration have first ends 16a, 17a and second ends 16b, 17b, respectively. The first ends 16a, 17a are the start ends of coil winding for the first and second coils 16, 17 in the clockwise direction, respectively. The second ends 16b, 17b are the finish ends of coil winding for the first and second coils 16, 17 in the clockwise direction, respectively. Thus, the respective first ends 16a, 17a of the first and second coils 16, 17 make the inner ends of the spiral coils. While, the respective second ends 16b, 17b of the first and second coils 16, 17 make the outer ends of the spiral coils.

The first ends 16a, 17a of the first and second coils 16, 17 are coupled to a pair of connecting terminals, i.e., first and second connecting terminals 18, 19 through jumper wires 20, 21, respectively in a manner similar to that of the first example of the first inductive signal transfer device 15a. However, the second end 16b of the first coil 16 is coupled to the second connecting terminal 19. While, the second end 17b of the second coil 17 is coupled to the first connecting terminal 18. Thus, the first and second coils 16, 17 are connected in parallel between the first and second connecting terminals 18, 19. The jumper wires 20, 21 cross parts of the first and second coils 16, 17, but are insulated from the turns in a manner similar to that of the first example of first inductive signal transfer device 15a.

Figure 4:
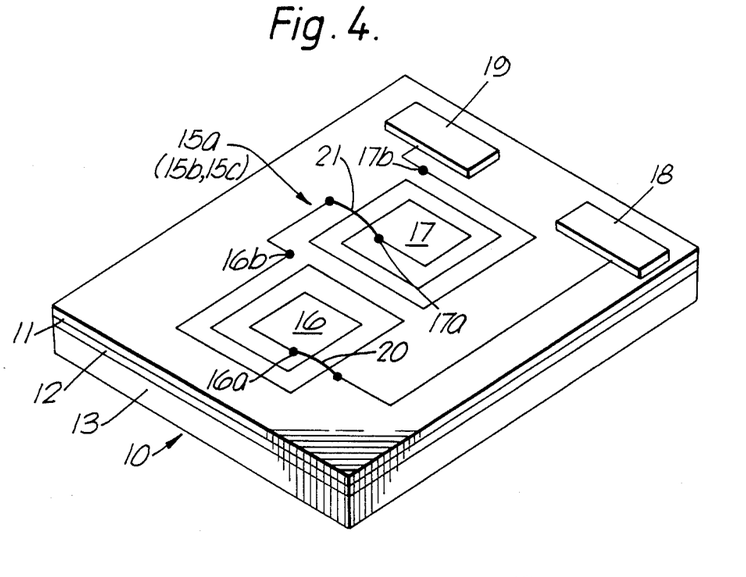
FIG. 4 is a diagramatic plan view of the third example of the electro-magnetic transducer according to the present invention.

Referring now to FIG. 4, a third example of the first, second and third inductive signal transfer devices 15a, 15b and 15c, e.g., the first inductive signal transfer device 15a will be described. In this third example, the first inductive signal transfer device 15a is comprised of first and second coils 16, 17 in similar to the first example of the first inductive signal transfer device 15a (see FIG. 2). The first and second coils 16, 17 are each comprised of a plurality of turns so that the first and second coils 16, 17 are wound spirally similar to the first example of first inductive signal transfer device 15a. However, the first and second coils 16, 17 are wound outward in the opposite direction with each other. For example, the first coil 16 is wound outward in the clockwise direction. But the second coil 17 is wound outward in the counter clockwise direction. The first and second coils 16, 17 of the spiral coil configuration have first ends 16a, 17a and second ends 16b, 17b, respectively. The first ends 16a, 17a are the start ends of coil winding for the first and second coils 16, 17 in the clockwise direction or the anti-clockwise direction, respectively. The second ends 16b, 17b are the finish ends of coil winding for the first and second coils 16, 17 in the clockwise direction or the anti-clockwise direction, respectively. Thus, the respective first ends 16a, 17a of the first and second coils 16, 17 make the inner ends of the spiral coils. While, the respective second ends 16b, 17b of the first and second coils 16, 17 make the outer ends of the spiral coils.

The first end 16a of the first coil 16 is coupled to a first connecting terminal 18 through a jumper wire 20 similar to the first example of the first inductive signal transfer device 15a. However, the first end 17a of the second coil 17 is coupled to the second end 16b of the first coil 16 through a second jumper wire 21. Then, the second end 17b of the second coil 17 is coupled to a second connecting terminals 19. Thus, the first and second coils 16, 17 are connected in series between the first and second connecting terminals 18, 19 similar to the first example The jumper wires 20, 21 cross parts of the first and second coils 16, 17, but are insulated from the turns similar to the first example of first inductive signal transfer device 15a.

Figure 5:
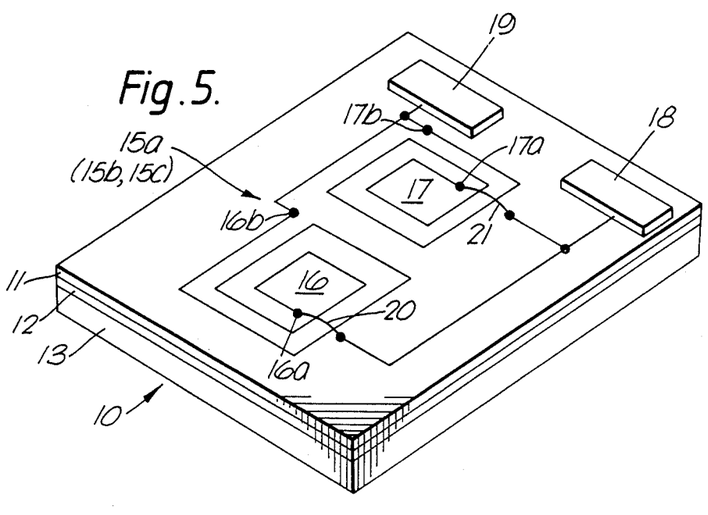
FIG. 5 is a diagramatic plan view of the fourth example of the electro-magnetic transducer according to the present invention.

Referring now to FIG. 5, a fourth example of the first, second and third inductive signal transfer devices 15a, 15b and 15c, e.g., the first inductive signal transfer device 15a will be described. In this fourth example, the first inductive signal transfer device 15a is comprised of a pair of coils, first and second coils 16, 17 similar to the first example of the first inductive signal transfer device 15a (see FIG. 2). The first and second coils 16, 17 are each comprised of a plurality of turns so that the first and second coils 16, 17 are wound spirally similar to the first example of first inductive signal transfer device 15a. However, the first and second coils 16, 17 are wound outward in the opposite direction with each other in a manner similar to that of the third example. That is, the first coil 16 is wound outward in the clockwise direction. The second coil 17 is wound outward in the counter clockwise direction. The first and second coils 16, 17 of the spiral coil configuration have first ends 16a, 17a and second ends 16b, 17b, respectively. The first ends 16a, 17a are the start ends of coil winding for the first and second coils 16, 17 in the clockwise direction or the counter-clockwise direction, respectively. The second ends 16b, 17b are the finish ends of coil winding for the first and second coils 16, 17 in the clockwise direction or the counter-clockwise direction, respectively. Thus, the respective first ends 16a, 17a of the first and second coils 16, 17 make the inner ends of the spiral coils. While, the respective second ends second ends 16b, 17b of the first and second coils 16, 17 make the outer ends of the spiral coils.

The first end 16a of the first coil 16 is coupled to a first connecting terminal 18 through a jumper wire 20 similar to the first example of the first inductive signal transfer device 15a. However, the first end 17a of the second coil 17 is coupled to the first connecting terminal 18 through a second jumper wire 21. The second ends 16b, 17b of the first and second coils 16, 17 are coupled to a second connecting terminal 18 together. Thus, the first and second coils 16, 17 are connected in parallel between the first and second connecting terminals 18, 19 similar to the second example. The jumper wires 20, 21 cross parts of the first and second coils 16, 17, but are insulated from the turns similar to the first example of first inductive signal transfer device 15a.

Figure 6:
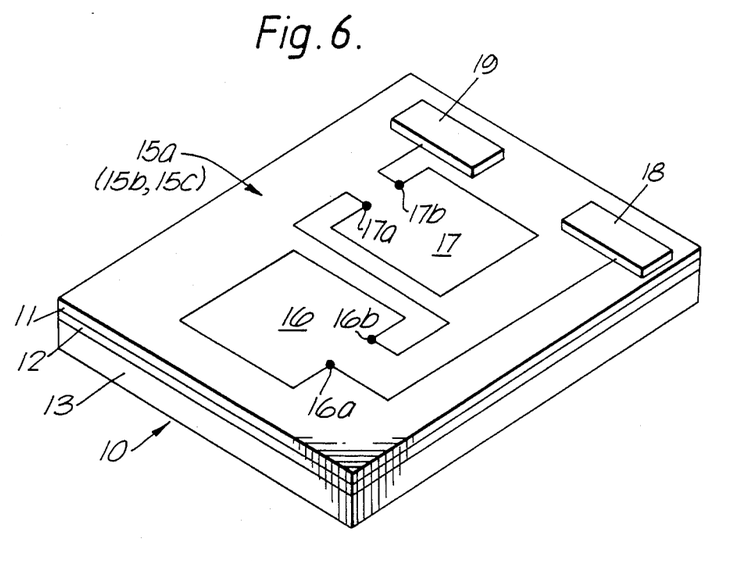
FIG. 6 is a diagramatic plan view of the fifth example of the electro-magnetic transducer according to the present invention.

Referring now to FIG. 6, a fifth example of the first, second and third inductive signal transfer devices 15a, 15b and 15c, e.g., the first inductive signal transfer device 15a will be described. In this fifth example, the first inductive signal transfer device 15a, is comprised of a pair of coils, i.e., first and second coils 16, 17 similar to the first example of the first inductive signal transfer device 15a (see FIG. 2). The first and second coils 16, 17 are each, however, comprised of a single turn of coil. The first and second coils 16, 17 of the single turn coil configuration have first ends 16a, 17a and second ends second ends 16b, 17b, respectively. The first ends 16a, 17a are the start ends of coil winding in the clockwise direction for the first and second coils 16, 17. The second ens 16b, 17b are the finish ends of coil winding in the clockwise direction for the first and second coils 16, 17.

The first ends 16a, 17a of the first and second coils 16, 17 are coupled to a pair of connecting terminals, i.e., first and second connecting terminals 18, 19, respectively. The second ens 16b, 17b of the first and second coils 16, 17 are coupled to each other. Thus, the first and second coils 16, 17 are connected in series between the first and second connecting terminals 18, 19.

Figure 7:
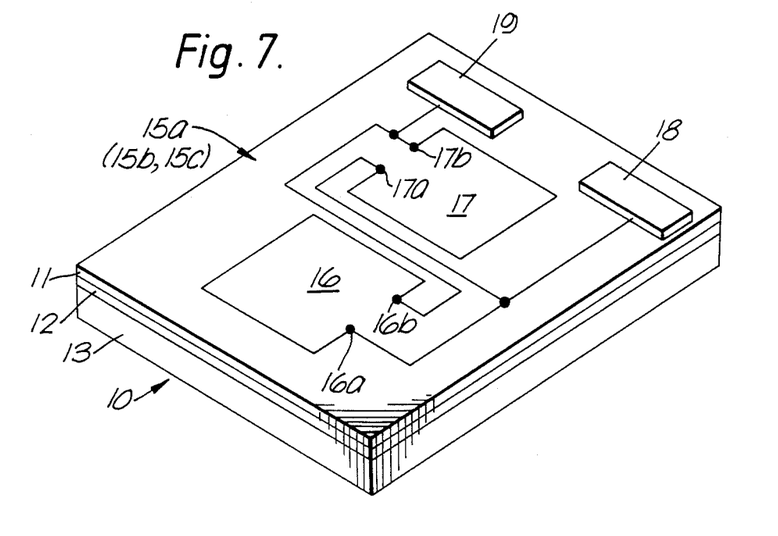
FIG. 7 is a diagramatic plan view of the sixth example of the electro-magnetic transducer according to the present invention.

Referring now to FIG. 7, a sixth example of the first, second and third inductive signal transfer devices 15a, 15b and 15c, e.g., the first inductive signal transfer device 15a will be described. In this sixth example, the first inductive signal transfer device 15a is also comprised of a pair of coils first and second coils 16, 17, which are comprised of a single turn of coil, similar to the fifth example of the first inductive signal transfer device 15a. The first and second coils 16, 17 of the single turn coil configuration have first ends 16a, 17a and second ends 16b, 17b, respectively. The first ends 16a, 17a are the start ends of coil winding in the clockwise direction for the first and second coils 16, 17. The second ends 16b, 17b are the finish ends of coil winding in the clockwise direction for the first and second coils 16, 17.

The first ends 16a, 17a of the first and second coils 16, 17 are coupled to a pair of connecting terminals, i.e., first and second connecting terminals 18, 19 respectively, similar to the first example of the first inductive signal transfer device 15a. However, the second end 16b of the first coil 16 is coupled to the second connecting terminal 19. While, the second end 17b of the second coil 17 is coupled to the first connecting terminal 18. Thus, the first and second coils 16, 17 are connected in parallel between the first and second connecting terminals 18, 19.

The first to sixth examples of the construction for the first, second and third inductive signal transfer devices 15a, 15b and 15c, as shown in FIGS. 2 to 7, have a common feature as described below. As will be easily understood from FIGS. 2 to 7, the first and second coils 16, 17 are provided for always generating magnetic fluxes 16m, 17m in opposite directions with each other, in accordance with a current applied thereto through the first and second connecting terminals 18, 19. For example, when the first coil 16 generates the magnetic flux 16m which flow upward in the drawings from the top surface of the IC card 10 at the center of the first coil 16, the second coil 17 generates the magnetic flux 17m which flows downward in the drawing to the top surface of the IC card at the center of the second coil 17. Thus, the magnetic fluxes 16m, 17m make a loop of magnetic flux 15m.

Figure 8:
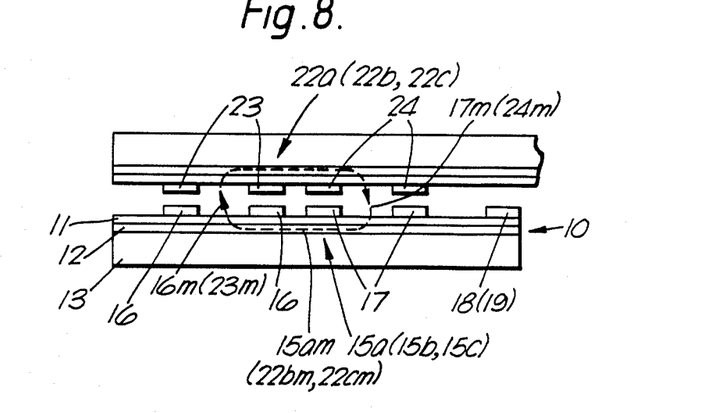
FIG. 8 is a diagramatic side view showing a state in which the IC card according to the present invention is applied into an IC card reader adapted for the IC card.
Figure 9:
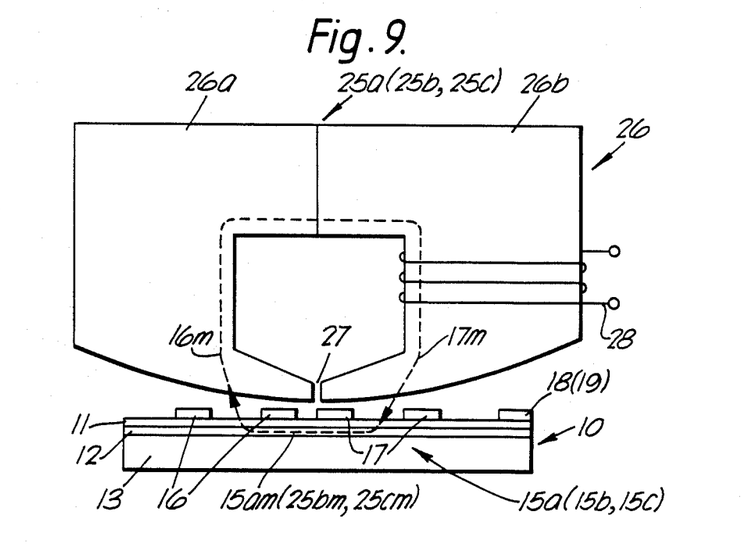
FIG. 9 is a diagramatic side view showing a state in which the IC card according to the present invention is applied into a conventional magnetic card reader.

Referring now to FIGS. 8 and 9, the operations of the first, second and third inductive signal transfer devices 15a, 15b and 15c of the IC card 10 will be described. The first inductive signal transfer device 15a operates to apply information data stored in the semiconductor memory chip 14a through the microprocessor 14b to card readers, e.g., the IC card reader adapted for the IC card 10 and also the conventional magnetic card reader as described above. The second inductive signal transfer device 15b operates to receive information data from the card readers, e.g., the IC card reader and also the conventional magnetic card reader. The third inductive signal transfer device 15c operates to receive a drive signal or a power signal for activating circuits such as the semiconductor memory chip 14a and the microprocessor 14b in the IC card 10 from the card readers, e.g., the IC card reader and also the conventional magnetic card reader.

FIG. 8 diagramatically shows a state in which the IC card 10 is applied into a card reader (referred to as an IC card reader hereafter, not shown) adapted for the IC cards. The IC card reader is provided with first, second and third electro-magnetic transducers 22a, 22b and 22c. These electro-magnetic transducers 22a, 22b and 22c are adapted for facing toward the first, second and third inductive signal transfer device 15a, 15b and 15c of the IC card 10 when the IC card 10 is inserted in the IC card reader.

FIG. 9 diagramatically shows a state in which the IC card 10 is applied into the conventional magnetic card reader (not shown). The magnetic card reader is provided with first, second and third magnetic heads 25a, 25b and 25c. These magnetic heads 25a, 25b and 25c are adapted for facing toward the first, second and third inductive signal transfer device 15a, 15b and 15c of the IC card 10 when the IC card 10 is inserted in the magnetic card reader.

Referring now to FIG. 8, the operation of the first inductive signal transfer device 15a of the IC card 10 will be described when the IC card 10 is applied to the IC card reader. In the IC card reader, the first inductive signal transfer device 15a faces toward the corresponding first electromagentic transducer 22a provided in the IC card reader. Typically, the first electro-magnetic transducer 22a has a construction identical with the first inductive signal transfer device 15a (or 15b, 15c), i.e., the coil configuration. For example, the first electromagentic transducer 22a preferably takes the coil construction the same as the first inductive signal transfer device 15a. That is, the first electro-magnetic transducer 22a is comprised of a pair of coils, i.e., first and second coils 23, 24 are connected together in a manner identical with any of the constructions shown in FIGS. 2 to 7. However, the first and second coils 23, 24 of the first electro-magentic transducer 22a are wound in the direction opposite to the first and second coils 16, 17 of the first inductive signal transfer device 15a, respectively. For example, the first and second coils 23, 24 of the first electro-magentic transducer 22a are wound outward in the counter-clockwise direction, when the first and second coils 16, 17 of the first inductive signal transfer device 15a are wound outward in the clockwise direction, as shown in FIG. 2. In the state as described above, the first and second coils 16, 17 of the first inductive signal transfer device 15a are positioned so that first and second coils 16, 17 of the first inductive signal transfer device 15a fact toward the first and second coils 23, 24 of the first electro-magentic transducer 22a, respectively.

When the first inductive signal transfer device 15a is activated by a signal applied from the microprocessor 14b, the first and second coils 16, 17 generate the magnetic fluxes 16m, 17m which flow in opposite directions with each other. For example, when the magnetic flux 16m flow upward in the drawing from the surface of the IC card 10, at the center of the first coil 16, the magnetic flux 17m flows downward in the drawing to the surface of the IC card 10, at the center of the second coil 17. The magnetic fluxes 16m, 17m flow through the first and second coils 23, 24 of the first electro-magnetic transducer 22a and the central ferromagnetic material layer 12 of the IC card 10 so that the magnetic fluxes 16m, 17m make a loop of magnetic flux 15am. Thus, the magnetic flux 15am generated by the first inductive signal transfer device 15a is detected by the first electro-magnetic transducer 22a. A a result, the signal applied from the microprocessor 14b, i.e., the information data stored in the semiconductor memory chip 14a is effectively transferred to the IC card reader and read thereby.

Referring now to FIG. 9, the operation of the first inductive signal transfer device 15a of the IC card 10 will be described when the IC card 10 is applied to the magnetic card reader. In the magnetic card reader, the first inductive signal transfer device 15a faces toward the first magnetic head 25a provided in the magnetic card reader. The first magnetic head 25a is comprised of a ring-shape core 26 with a gap 27 and a coil 28 wound on the core 26. The core 26 is formed by a pair of iron yokes 26a, 26b. In the state as described above, the first and second coils 16, 17 of the first inductive signal transfer device 15a are positioned so that the center between the first and second coils 16, 17 faces toward the gap 27 of the first magnetic head 25a.

When the first inductive signal transfer device 15a is activated by a signal applied form the microprocessor 14b, the first and second coils 16, 17 generate the magnetic fluxes 16m, 17m which flow in opposite directions with each other. When the magnetic flux 16m flows upward in the drawing from the surface of the Ic card 10, at the center of the first coil 16, the magnetic flux 17m flows downward in the drawing to the surface of the IC card 10, at the center of the second coil 17, so that the magnetic fluxes 16m, 17m make a loop of magnetic flux 15am of the first inductive signal transfer device 15a. Thus, the magnetic flux 15am generated by the first inductive signal transfer device 15a is detected by the first magnetic head 25a. A a result, the signal applied from the microprocessor 14b, i.e., the information data stored in the semiconductor memory chip 14a is effectively transferred to the magnetic card reader and read thereby.

The second inductive signal transfer device 15b of the IC card 10 operates to receive information data of card readers, e.g., the IC card reader adapted for the IC card and also the conventional magnetic card reader as described above. The second inductive signal transfer device 15b has a construction identical with the first inductive signal transfer device 15a, e.g., any of the constructions shown in FIG. 2 to 7. The operation of the second inductive signal transfer device 15b will now be described in reference to the drawings, i.e., FIGS. 8 and 9.

Referring now to FIG. 8, the operation of the second inductive signal transfer device 15b of the IC card 10 will be described when the IC card 10 is applied to the IC card reader. In the IC card reader, the second inductive signal transfer device 15b faces toward the corresponding second electro-magentic transducer 22b provided in the IC card reader. Typically, the second inductive signal transfer device 15b has a construction identical with the first electro-magnetic transducer 22a. That is, the second electro-magnetic transducer 22b is comprised of a pair of coils, i.e., first and second coils 23, 24. In the state as described above, the first and second coils 16, 17 of the second inductive signal transfer device 15b are positioned so that the first and second coils 16, 17 of the second inductive signal transfer device 15b face toward the first and second coils 23, 24 of the second electro-magentic transducer 22b, respectively. When the second inductive signal transfer device 15b is activated by a signal of the IC card reader, the first coil 23 of the second electro-magnetic transducer 22b generates a magnetic flux 23m which flows, for example, downward in the drawing from the first coil 23 to the IC card 10. On the other hand, the second coil 24 of the second electro-magnetic transducer 22b generates a magnetic flux 24m which flow upward in the drawing from the IC card 10 to the second coil 24, opposite to the first coil 23. The magnetic fluxes 23m, 24m flow through the first and second coils 23, 24 of the second electro-magnetic transducer 22b and the central ferromagnetic material layer 12 of the IC card 10 so that the magnetic fluxes 23m, 24m make a loop of magnetic flux 22bm. Thus, the magnetic flux 22bm generated by the second electro-magentic transducer 22b is detected by the second inductive signal transfer device 15b. A a result, the signal applied from the IC card reader, i.e., the information data for writing into the semiconductor memory chip 14a of the IC card 10 is effectively transfered to the IC card 10 and written into the semiconductor memory chip 14a. The second inductive signal transfer device 15b of the IC card 10 effectively detects the magnetic fluxes applied from the second inductive signal transfer device 15b of the IC card reader, as described above. However, the second inductive signal transfer device 15b is hardly affected by a noisy magnetic flux other than the magnetic fluxes of the second inductive signal transfer device 15b because the noisy magnetic flux generally flows through both the first and second coils 16, 17 in the same direction, not the opposite direction. The first and second coils 16, 17, then generate detected signals of opposite direction according to the noisy magnetic flux. As a result, the detected signals of opposite direction cancel each other.

Referring now to FIG. 9, the operation of the second inductive signal transfer device 15b of the IC card 10 will be described when the IC card 10 is applied to the magnetic card reader. In the magnetic card reader, the second inductive signal transfer device 15b faces toward the second magnetic head 25b provided in the magnetic card reader. When the second magnetic head 25b is activated by a signal of the magnetic card reader, the second magnetic head 25b generates a magnetic flux 25bm. The magnetic flux 25bm leaks outside from the gap 27. Then, the magnetic flux 25bm flows, for example, downward in the drawing from the iron yoke 26a of the second magnetic head 25b to the IC card 10 through the first coil 16 of the second inductive signal transfer device 15b. The magnetic flux 25bm further flows through the central ferromagnetic material layer 12 of the IC card 10 and then returns into the iron yoke 26b of the second magnetic head 25b through the second coil 17 of the second inductive signal transfer device 15b. Thus, the magnetic flux 25bm generated by the second magnetic head 25b is detected by the second inductive signal transfer device 15b. As a result, the signal applied from the magnetic card reader, i.e., the information data for writing into the semiconductor memory chip 14a of the IC card 10 is effectively transferred to the IC card 10 and written into the semiconductor memory chip 14a. The second inductive signal transfer device 15b is also hardly affected by a noisy magnetic flux other than the magnetic flux 25bm of the second magnetic head 25b, because the noisy magnetic flux generally flow through both the first and second coils 16, 17 of the second inductive signal transfer device 15b in the same direction, not but the opposite direction. The first and second coils 16, 17 of the second inductive signal transfer device 15b, then generate detected signals of opposite direction according to the noisy magnetic flux. As a result, the detected signals of opposite direction cancel each other.

Referring now also to FIG. 9, the operation of the third inductive signal transfer device 15c of the IC card 10 will be described when the IC card 10 is applied to the magnetic card reader. In the magnetic card reader, the third inductive signal transfer device 15c faces the third magnetic head 25c provided in the magnetic card reader. When the third magnetic head 25c is activated by the drive signal applied from the magnetic card reader, the third magnetic head 25c generates a magnetic flux 25cm. The magnetic flux 25cm leaks outside from the gap 27. Then, the magnetic flux 25cm flows, for example, downward in the drawing from the iron yoke 26a of the third magnetic head 25c to the IC card 10 through the first coil 16 of the third inductive signal transfer device 15c. The magnetic flux 25cm further flows through the central ferromagnetic material layer 12 of the IC card 10 and then returns into the iron yoke 26b of the third magnetic head 25c through the second coil 17 of the third inductive signal transfer device 15c. Thus, the magnetic flux 25cm generated by the third magnetic head 25c is detected by the third inductive signal transfer device 15c. A a result, the drive signal for activating the circuits such as the semiconductor memory chip 14a and the microprocessor 14b is effectively transferred to the IC card 10. The third inductive signal transfer device 15c is also hardly affected by a noisy magnetic flux other than the magnetic fluxes of the third magnetic head 25c because the noisy magnetic flux generally flows through both the first and second coils 16, 17 of the third inductive signal transfer device 15c in the same direction, not but the opposite direction. The first and second coils 16, 17 of the third inductive signal transfer device 15c, then generate detected signals of opposite direction according to the noisy magnetic flux. As a result, the detected signals of opposite direction cancel each other.

As described above, the present invention can provide an extremely preferable data card with a inductive signal transfer device.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation of material to the teaching of the present invention without departing from the central cope thereof. Therefore, it is intended that this invention not be limited to the particular embodiment disclosed as the best mode contemplated for carrying out this invention, but that the invention include all embodiments falling within the scope of the appended claims.

What is claimed is:

1. A data card having a planar surface which can be resiliently flexed to a degree comprising:
a laminated structure member having at least a synthetic resin protective layer and a ferromagnetic material layer;
an electric circuit device embedded in the laminated structure member;
an electro-magentic transducer having a pair of coils including a first coil and a second coil which are formed on the laminated structure member, the pair of coils being coupled to the electric circuit device for generating magnetic fluxes of opposite directions with each other according to an information signal supplied from the electric circuit device; and
the magnetic flux generated by the first coil flowing in one direction vertical to the surface of the card at the center of first coil and the magnetic flux generated by the second coil flowing in an opposite direction vertical to the surface of the card at the center of the second coil forming a loop of magnetic flux.

2. The data card of claim 1, wherein the pair of coils are connected in series with each other.

3. The data card of claim 2, wherein the pair of coils are each formed in a plural turn configuration.

4. The data card of claim 3, wherein the pair of coils are wound in the same direction and each has an inner end and an outer end, and wherein one of the coils is connected at its outer end to the outer end of the other coil.

5. The data card of claim 3, wherein the pair of coils are wound in the opposite direction and each has an inner end and an outer end, and wherein one of the coils is connected at its outer end to the inner end of the other coil.

6. The data card of claim 2, wherein the pair of coils are each formed in a single turn configuration.

7. The data card of claim 6, wherein the pair of coils have each one end in one direction and another end in the other direction, and wherein one of the coils is connected at its one end to the other end of the other coil.

8. The data card of claim 1, wherein the pair of coils are connected in parallel with each other.

9. The data card of claim 8, wherein the pair of coils are wound in the same direction and each has an inner end and an outer end, and wherein one of the coils is connected at its outer end to the inner end of the other coil.

10. The data card of claim 8, wherein the pair of coils are wound in the opposite direction and each has an inner end and an outer end, and wherein one of the coils is connected at its outer end to the outer end of the other coil.

11. The data card of claim 8, wherein the pair of coils are each formed in a single turn configuration.

12. The data card of claim 11, wherein the pair of coils have each one end in one direction and other end in the other direction, and wherein one of the coils is connected at its one end to the one end of the other coil.

13. A data card having a planar surface which can be resiliently flexed to a degree comprising:
a laminated structure member having at least a synthetic resin protective layer and a ferromagnetic material layer;
an electric circuit device embedded in the laminated structure member;
an electro-magnetic transducer having a pair of coils including a first coil and a second coil which are formed on the laminated structure member, the pair of coils being provided for receiving magnetic fluxes of opposite directions with each other and coupled to the electric circuit device for applying an electric signal generated by the magnetic fluxes of opposite directions thereto; and the magnetic flux received by the first coil flowing in one direction vertical to the surface of the card at the center of the first coil and the magnetic flux received by the second coil flowing in an opposite direction vertical to the surface of the card at the center of the second coil forming a loop of magnetic flux.

14. The data card of claim 13, wherein the pair of coils are connected in series with each other.

15. The data card of claim 14, wherein the pair of coils are each formed in a plural turn configuration.

16. The data card of claim 15, wherein the pair of coils are wound in the same direction and each has an inner end and an outer end, and wherein one of the coils is connected at its outer end to the outer end of the other coil.

17. The data card of claim 15 wherein the pair of coils are wound in the opposite direction and each has an inner end and an outer end, and wherein one of the coils is connected at its outer end to the inner end of the other coil.

18. The data card of claim 14, wherein the pair of coils each includes a single turn configuration.

19. The data card of claim 18, wherein the pair of coils have each one end in one direction and other end in the other direction, and wherein one of the coils is connected at its one end to the other end of the other coil.

20. The data card of claim 13, wherein the pair of coils are connected in parallel with each other.

21. The data card of claim 20, wherein the pair of coils are each formed in a plural turn configuration.

22. The data card of claim 21, wherein the pair of coils are wound in the same direction and each has an inner end and an outer end, and wherein one of the coils is connected at its outer end to the inner end other coil.

23. The data card of claim 20, wherein the pair of coils are wound in the opposite direction and each has an inner end and an outer end, and wherein one of the coils is connected at its outer end to the outer end of the other coil.

24. The data card of claim 20 wherein the pair of coils are each formed in a single turn configuration.

25. The data card of claim 24, wherein the pair of coils have each one end in one direction and another end in the other direction, and wherein one of the coils is connected at its one end to the one end of the other coil.

* * * * *